July 28, 1953 L. L. YOUNG ET AL 2,646,926

MULTIPLE-DECADE DIFFERENTIAL COUNTER

Filed Sept. 26, 1947 4 Sheets-Sheet 1

Inventor
RAYMOND M. WILMOTTE
LARRY L. YOUNG

By Samuel J Snyder

Inventor
RAYMOND M. WILMOTTE
LARRY L. YOUNG
By Samuel J Snyder

Inventor
RAYMOND M. WILMOTTE
LARRY L. YOUNG
By Samuel J. Snyder

MULTIPLE-DECADE DIFFERENTIAL COUNTER

Filed Sept. 26, 1947 4 Sheets-Sheet 4

RAYMOND M. WILMOTTE
LARRY L. YOUNG
Inventor
By Samuel J. Snyder

Patented July 28, 1953

2,646,926

UNITED STATES PATENT OFFICE 2,646,926

MULTIPLE-DECADE DIFFERENTIAL COUNTER

Larry L. Young, Pasadena, Calif., and Raymond M. Wilmotte, Washington, D. C., assignors, by direct and mesne assignments, to Padevco, Inc., Washington, D. C., a corporation of Delaware Application September 26, 1947, Serial No. 776,324

4 Claims. (Cl. 235—92)

Figure 1:
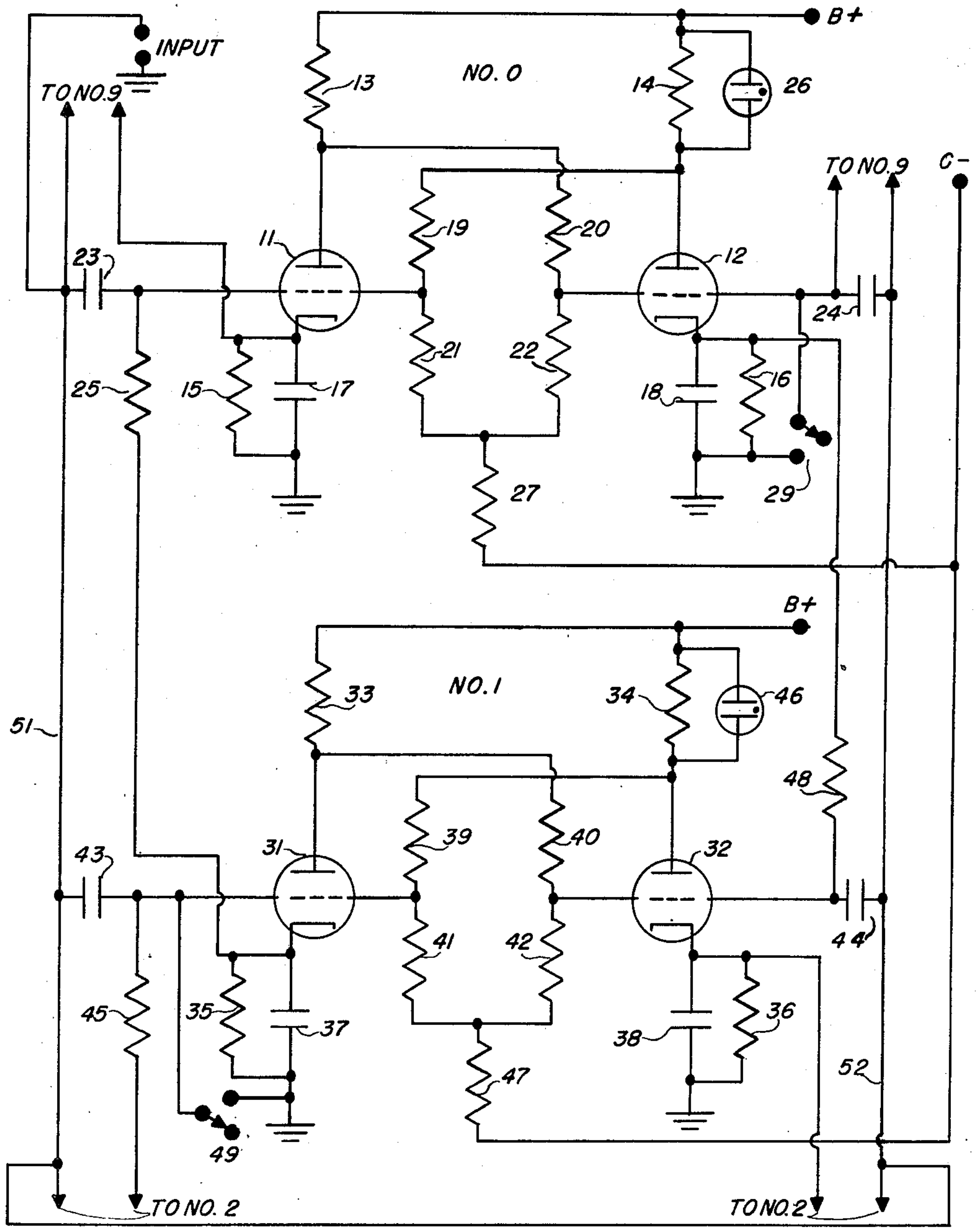

This invention relates to a differential, multiple-decade, electronic counter capable of adding and subtracting. More particularly the invention relates to such an electronic counter for counting pulses of one type additively and pulses of another type subtractively so as to count the difference between the numbers of two types of pulses.

In a copending application of Raymond M. Wilmotte is disclosed a differential or reversible ring counter capable of counting positive pulses additively and negative pulses subtractively so as to give the resultant or algebraic difference between the positive and negative pulses. The invention described in this application provides a means for connecting a plurality of such reversible ring counters so that they will count units, tens, hundreds, etc. To properly achieve such counting it is necessary for each decade counter to be able to count backwards as well as forwards and that all decade counters after the units counter shall produce a positive count when the preceding counter completes a decade by a 9 to 0 count; and shall produce a negative count when the preceding counter cancels a completed decade by a count from 0 to 9. This objective is achieved by coupling the decade ring circuits by a pulse generating circuit which produces pulses that are counted positively and negatively in a following decade counter in response to the addition or subtraction of a count at the end of a decade in the preceding decade counter.

Accordingly, it is an object of our invention to provide a multiple-decade differential counter which counts certain pulses positively and other pulses negatively.

It is another object of our invention to provide a multiple decade reversible electronic counter which is rapid and reliable.

Figure 2:
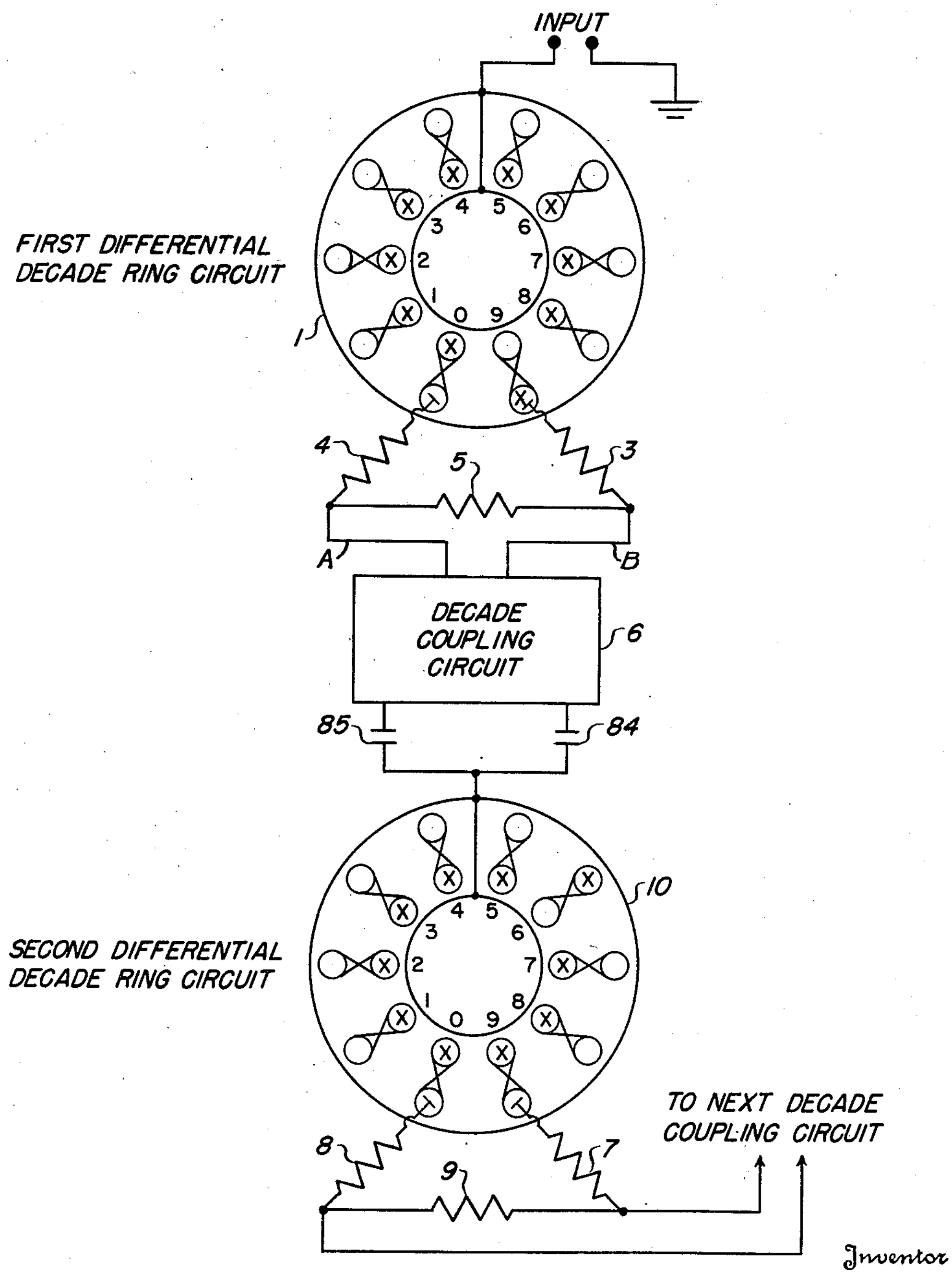
Figure 3:
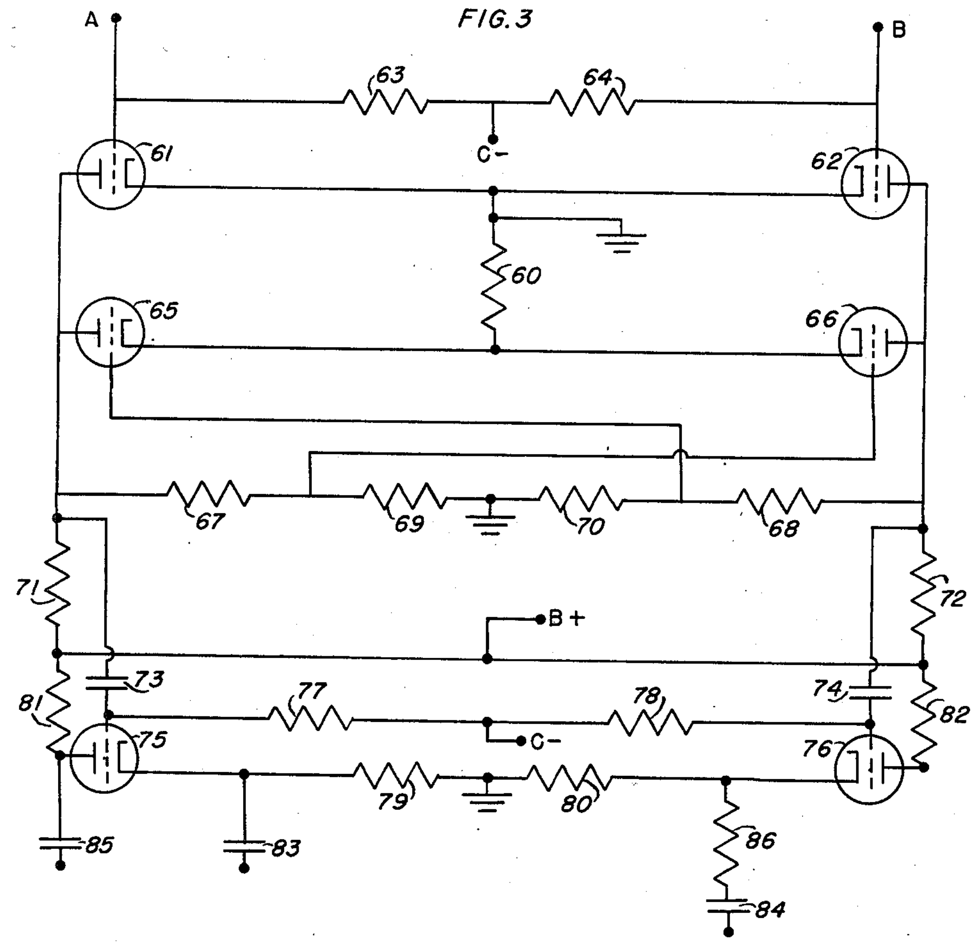
Figure 4:
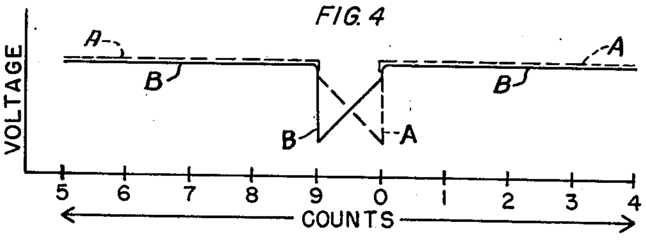
Figure 5:
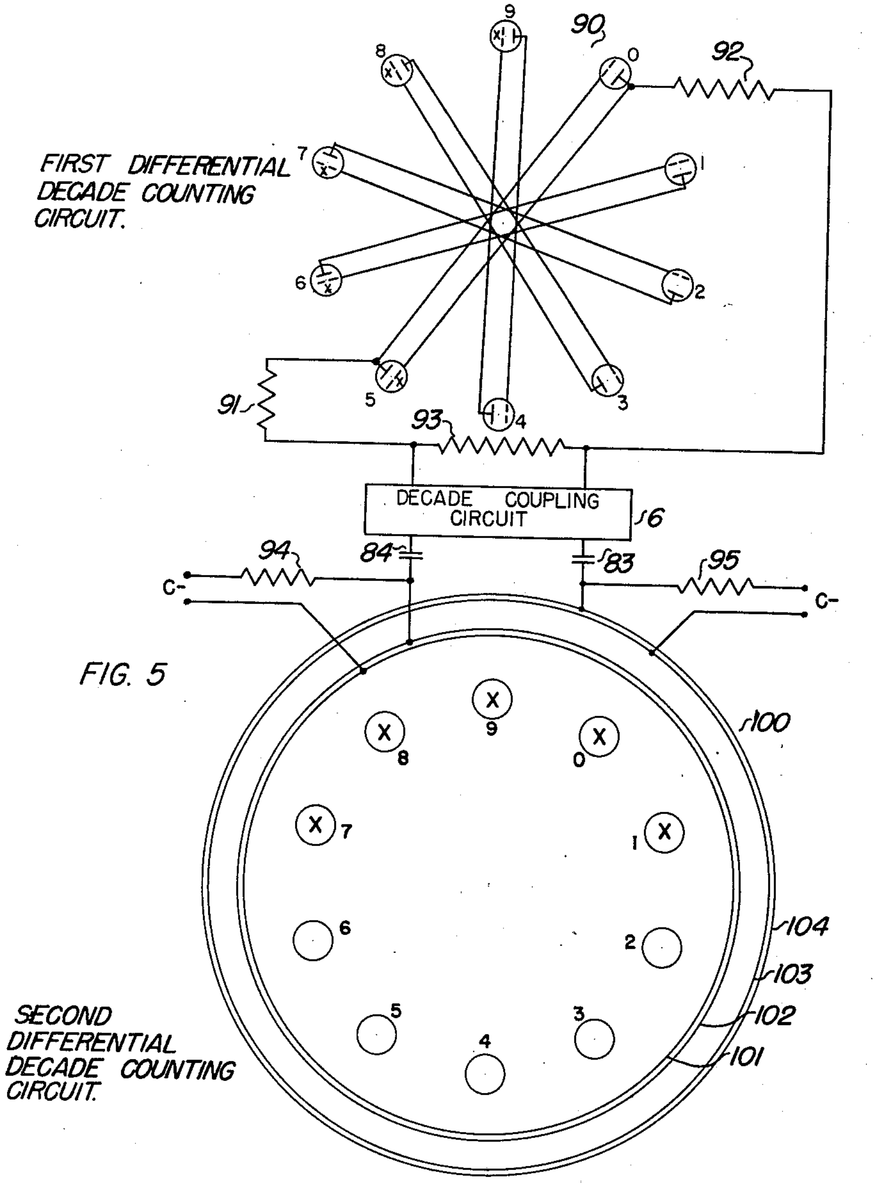

The invention and the objects thereof will be fully understood from the following description and the drawing in which:

Fig. 1 is a diagram showing the circuit and interconnections of the stages of a differential decade circuit, Fig. 2 is a block diagram of a multiple decade differential counter, Fig. 3 is a circuit diagram of the coupling circuit, Fig. 4 is a diagram showing the voltages at the terminals A and B in Fig. 1, Fig. 5 is a diagram of another differential multiple-decade counter.

Referring to Fig. 2, there is shown a differential counter consisting of reversible or differential decade ring circuits 1 and 10. These decade ring circuits will be described hereafter in connection with Fig. 1, and are fully described in the copending application of Raymond M. Wilmotte entitled, "Differential Electronic Counter." Each of the ten stages of the decade counter consists of an Eccles-Jordan circuit. The ten stages are numbered from 1 to 0. High resistance resistors 3 and 4 are connected to the anodes of the outer tubes of stages 9 and 0, and the other ends of resistors 3 and 4 are connected to terminals A and B. Between terminals A and B is connected another resistor 5. A coupling circuit 6 has its input connected to terminals A and B and its output pulses are impressed on the input of the ring counter 10. In the same manner the anodes of the outer tubes of the 9th and 0 stages of ring circuit 10 are connected through resistors 7, 8, and 9 to other decade coupling circuits and decade ring circuits. Multiple-decade counters having as many decades as desired may thus be provided.

For a complete understanding of the differential ring circuits 1 and 10 in Fig. 2, reference is made to Fig. 1. In this figure are shown two of the ten stages of the decade counter. Each stage is connected to the preceding and the following stages in the same manner as is shown in Fig. 1. The stages shown in Fig. 1 may be thought of as being No. 0 and No. 1. Stage No. 0 consists of electron tubes 11 and 12. The anodes of these tubes are connected through resistors 13 and 14 to a source of positive voltage B+. The cathodes of these tubes are connected to ground through resistors 15 and 16 in parallel with condensers 17 and 18. The grids and anodes of tubes 11 and 12 are cross connected through resistors 19 and 20, as shown, to form an Eccles-Jordan circuit. The grids of these tubes are also connected to a source of negative bias voltage C— through resistors 21, 22 and 27. The grids are also connected through condensers 23 and 24 to input terminals upon which are impressed the pulses to be counted.

Stage No. 1 is substantially identical to stage No. 0 described above and consists of a pair of electron tubes 31 and 32 having plate resistors 33 and 34 and cathode resistors 35 and 36, in parallel with condensers 37 and 38. The circuits are also provided with feedback resistors 39 and 40 and grid bias resistors 41 and 42. The resistors 41 and 42 are connected to the grids of tubes 31 and 32 respectively, and the grids of tubes 31 and 32 are connected through condensers 43 aand 44 respectively to the source of pulses to be counted. The grid of tube 11 is connected through resistor 25 to the cathode of tube 31, that is, to the cathode of the left hand tube of the following stage. The grid of tube 32 is connected through resistance 48 to the cathode of tube 12, that is, to the cathode of the corresponding tube of the preceding stage. The grid of tube 31 will also be connected through resistor 45 to the cathode of the corresponding tube in stage 2 in the same manner that the grid of tube 11 is connected to the cathode of tube 31. Also the grid of tube 12 will be connected to the cathode of the corresponding tube of stage 9 in the same manner that the grid of tube 32 is connected to the cathode of tube 12. It will also be understood that the cathode of tube 11 will be connected to the corresponding tube of stage 9 in the same manner that the cathode of tube 31 is connected to the grid of tube 11.

In Fig. 2 the complete decade ring is shown schematically. The ten stages of the ring circuit are indicated by the numerals 0–9. Each stage consists of a pair of electron tubes such as 11 and 12 in Fig. 1. This is indicated in Fig. 2 by the two small circles positioned radially with respect to the numeral with which they are associated. The connections between the ten stages of the ring circuit are not shown. In other words this is not an electrical diagram but a schematic diagram intended to show the juxtaposition and arrangement of the ten stages of the ring counter. It will of course be understood that the ring may include any number of stages other than ten, although decade rings are the most practical. For the purpose of explaining the invention the decade ring is illustrated. Nine of the inner tubes represented by the nine inner circles contain an X. This indicates that these nine tubes are in a more conducting state than their corresponding outer tubes. However, in stage No. 9 the outer tube is in a more conducting state than the inner tube. The ring circuit in Fig. 2 therefore indicates the count of No. 9. The next positive pulse from the input impressed on conductors 51 and 52 will be applied to the grids of all tubes and will cause the count to advance from stage 9 to stage 0. The manner in which this will be accomplished will be described hereinafter. A negative pulse impressed on conductors 51 and 52, and consequently on the grids of all the tubes, will cause the count to move from 9 to 8 by making the inner tube of stage 9 conductive and the inner tube of stage 8 non-conductive or less conductive. It will be noted that only one tube of each stage can be in the conductive state, as is characteristic of an Eccles-Jordan circuit, and that only one stage is in a different state of equilibrium from all the other stages. This state of equilibrium can be rotated clockwise or counter clockwise by positive and negative pulses so that the ring circuit itself can assume ten different states of equilibrium, corresponding to the ten positions of the outer conducting tube.

The operation of this circuit is as follows: Let it be assumed that the decade ring is registering a count of zero and that therefore tube 12 is in a more conductive state than tube 11. All other right hand tubes such as tube 32 will therefore be in a less conductive state than their mates, for example tube 31. The current through resistor 16 in the cathode circuit of tube 12 will raise the potential of the grid of tube 32. Since the anode of tube 32 is also at a high potential because this tube is non-conductive, tube 32 is conditioned for becoming conductive in response to a positive pulse from the source of input pulses. In other words the positive pulses will advance the count from stage 0 to stage 1. It will also be evident that tubes 11 and 32 are the only tubes that have a high grid and high plate potential and are therefore in condition to respond to a positive pulse. When tube 32 becomes conductive its plate potential drops and lowers the grid potential of tube 31 and reduces the conductivity or cuts off the current in tube 31. Similarly tube 11 becomes conductive and cuts off tube 12. Thus stage 1 acquires the condition in which stage 0 was formerly.

Now assuming that stage 1 is in the condition representing a count, tube 32 will be more conductive than tube 31 whereas in all other stages left hand tubes, such as tube 11, will be more conductive than the right hand tubes, such as tube 12. Then tubes 11 and 32 are the only conductive tubes whose grids are connected to the cathodes of non-conductive tubes. Therefore the grids and anodes of tubes 11 and 32 are at low potentials. If a negative pulse is impressed on the ring circuit, tubes 11 and 32 will respond thereto and become non-conductive. The plate potentials of these two tubes will then rise, raising the grid potentials of tubes 12 and 31 and making these two tubes conductive. In this manner a negative pulse will transfer the count from stage 1 to stage 0. It will be evident that this process will occur successively between each stage and its adjacent stages, so that the count would be additive, or positive, for a positive pulse and negative or subtractive for a negative pulse.

The count may be indicated by placing small neon tubes 26, 46, etc., in some part of the circuit such as across the plate resistors 14, 34, etc., of each right hand tube circuit.

In a specific embodiment of my invention the circuit components had the following values:

Resistors:
- 13, 14=100,000 ohms
- 15, 16, 27=22,000 ohms
- 19, 20=250,000 ohms
- 21, 22, 25=47,000 ohms Condensers:
- 23, 24=.001 mfd.
- 17, 18=5 mfd.

Tubes 11 and 12 were actually a single twin triode type 6SN7 tube. The circuit components and values are the same for all ten stages of the ring circuit. The values given above are not at all critical and very different values may be used equally as well.

To start the counter properly the No. 0 stage may be provided with a switch 29 to ground the grid of the right hand tube. All other stages may be provided with a switch similar to switch 49 in stage No. 1 to ground the grid of the left hand tubes. Before switching the counter on, these switches may be set to their grid grounding position. This will cause the counter to assume the zero count position. Alternatively, the counter may be set by switching it on and then grounding the grid of any stage that is in the wrong condition for the zero count. Other methods of establishing the zero count condition will be apparent to those skilled in the art.

The details of the coupling circuit 6, Fig. 2, for connecting one differential decade circuit to the next decade circuit is shown in Fig. 3. The coupling circuit 6 is substantially like the circuit shown in Fig. 1 of application 762,835, filed by Larry L. Young July 23, 1947, now Patent No.

2,479,802, for Differential Detection and Counting of Traveling Pulses. Referring to Fig. 3, there are shown a pair of electron tubes 61 and 62 having their grids connected to the terminals A and B. Also between these terminals are connected a pair of resistors 63 and 64 having their junction connected to a source of grid bias voltage C—, which maintains these tubes biased beyond cutoff. The cathodes of these tubes are grounded.

Tubes 65 and 66 have their anodes connected to the anodes of tubes 61 and 62 and their cathodes grounded through resistor 60. The grid of tube 65 is connected to the anode of tube 66 through resistor 68, and the grid of tube 66 is connected to the anode of tube 65 through resistor 67. If desired, resistors 67 and 68 may be shunted by small condensers to make the sides of the output pulses of tubes 65 and 66 steeper. Resistors 69 and 70 are connected to the grids of these tubes and have their junction grounded. The anodes of these tubes are connected through resistors 71 and 72 to a source of positive potential B+. The output pulses of tubes 65 and 66 are developed across the resistors 71 and 72 and impressed on the grids of tubes 75 and 76 through condensers 73 and 74. Tubes 75 and 76 are biased beyond cutoff by a bias voltage C— impressed on the grids of tubes 75 and 76 through resistors 77 and 78. The anodes of tubes 75 and 76 are connected to the source of B+ voltage through resistors 81 and 82. The output of tubes 75 and 76 may be taken from the anodes if negative pulses are required for the following decade circuit, or from the cathodes if positive pulses are required. Suitable coupling condensers 83, 84 and 85 and cathode load resistors 79 and 80 are provided. The resistor 86 connected to the cathode of tube 76 prevents tube 75 from impressing excessive potentials on the cathode of tube 76.

The operation of the coupling circuit of Fig. 3 will now be briefly described. During a cycle of counts of the first decade circuit the voltage on terminal A will be as shown by the dashed line A in Fig. 4. The solid line represents the voltage at terminal B. The solid and dashed lines coincide for all counts except 9 and 0. At 9 a negative potential exists at terminal B and a positive potential at terminal A. This condition is reversed for a count of 0. It follows that for a count of 9 the voltage across resistance 5 rises in the direction right to left, while for a count of zero the voltage across resistance falls in the same direction.

Tube 62 is thus made conductive on "zero" count, and tube 61 on "nine" count. When tube 62 is made conductive it reduces the voltage on the grid of tube 65, because of the voltage drop in anode resistance 72, and tube 66 triggers on, because tube 65 triggers off. When tube 65 triggers off, it raises the potential applied to the grid of tube 75. Similarly, the potential at the grid of tube 76 is reduced. However, tubes 75 and 76 are operated beyond cut-off. It follows that there will be no change in output of tube 76, while tube 75 will transfer a positive pulse via terminal 83 (or a negative pulse via terminal 85).

In analogous manner, a change of count from 0 to 9 produces a positive count via condenser 84, or a negative count from the anode of tube 76.

By deriving one input to counter stage 10 from the anode of tube 75 and the other from the cathode of tube 76, or vice versa, pulses of alternative polarity may be obtained at the input of counter stage 10, depending upon whether the count in counter stage 1 changed from 0 to 9, or vice versa.

More specifically, at the count of 9 the outer tube of the corresponding stage will conduct and develop a potential across resistor 3, which is applied to the control grid of tube 62. As the count in decade circuit 1 moves from 9 to 0, this potential will become large enough to overcome the grid bias voltage which normally maintains tube 61 biased beyond cutoff. While tube 62 conducts a positive pulse is produced through condenser 74 and impressed on the control grid of tube 76 while a coincidental negative pulse is applied to the control grid of tube 75. Since the control grids of tubes 75 and 76 are biased beyond cutoff tube 75 will be unaffected by the negative pulse, while tube 76 will transmit a positive pulse through condenser 84 to the second decade circuit 10. Conversely a count from 0 to 9 impresses a positive pulse on the grid of tube 75 and a coincidental negative pulse on the control grid of tube 76. Tube 76 will be unaffected by the negative pulse while tube 75 will transmit a negative pulse through condenser 85 to decade circuit 10, or a positive pulse through condenser 83.

Fig. 5 shows another type of differential ring circuit. This circuit has been described in the Review of Scientific Instruments, October 1946, pages 375, 376. For simplicity, only so much of the decade circuits 90 and 100 are shown here as is required to show the method of coupling successive decade circuits. Here the tubes numbered 0 to 9 are the inner ring of pentodes (see the above cited publication), of which five are always conducting as indicated by the crosses. Between the anodes of tubes 5 and 0 are connected resistors 91, 92 and 93. The decade coupling circuit 6, the circuit of which is shown in Fig. 3, is connected across resistor 93. If desired, suitable coupling condensers may be connected in series with resistors 91 and 92. A count from 9 to 0 in decade circuit 90 produces a positive count in decade circuit 100 by impressing a positive pulse through condenser 84, while a count from 0 to 9 produces a positive pulse through condenser 83 and causes a negative count in the second decade circuit 100. All four input conductors 101, 102, 103 and 104 are connected to a grid biasing source C—, suitable load resistors 94 and 95 being provided. It will be apparent from the above description that we have applied our coupling circuit to the decade circuits described in the Review of Scientific Instruments article to create a multiple decade differential counter.

Many variations, modifications, and other applications of our circuits will be apparent to those skilled in this art. The scope of our invention is limited only by the prior art and the following claims.

We claim:

1. A reversible electronic multi-decade counter comprising a plurality of reversible decade ring counters each arranged to count reversibly in response to input signals of alternative character occurring at random and each having a plurality of Eccles-Jordan flip-flop circuits arranged in cascade, each of said flip-flop circuits having two stable equilibrium states, one of said states representing a count and only one of said circuits being in the count representing state, circuit connections from each flip-flop circuit to the next preceding and next following circuit for impressing potentials on said next preceding and next following circuits for conditioning said next preceding and next following circuits so that the count representing state will be transferred to the next following circuit in response to a first predetermined type of pulse and to the next preceding circuit in response to a second predetermined type of pulse, and a pulse generating circuit having its input connected to a first of said plurality of decade ring counters, said pulse generating circuit having means for impressing a pulse of the first type on a second of said plurality of decade ring counters in response to the completion of a decade of counts in said first decade ring counter and impressing a pulse of the second type on said second of said plurality of decade ring counters in response to the cancellation of a completed decade of counts in said first decade ring counter, whereby the second decade ring counter algebraically counts the number of complete decades while the first decade ring counter algebraically counts the individual pulses.

2. A reversible counter comprising a plurality of reversible ring counters each arranged to count reversibly in response to input signals of alternative predetermined types occurring at random and each having a plurality of bi-stable circuits having stable equilibrium states, one of said states representing a count and only one of said circuits being in the count representing state at any one time, circuit connections from each bi-stable circuit to the next preceding and next following circuits for impressing potentials on said next preceding and next following circuits for conditioning said next preceding and next following circuits so that the count representing state will be transferred to the next following circuit in response to a first predetermined type of pulse and to the next preceding circuit in response to a second predetermined type of pulse, and a pulse generating circuit having its input connected to a first of said plurality of ring counters, said pulse generating circuit having means for impressing a pulse of the first type on a second of said plurality of ring counters in response to completion of a predetermined count in said first ring counter and impressing a pulse of the second type on said second of said plurality of ring counters in response to the cancellation of a predetermined count in said first ring counter.

3. A reversible counter system comprising a plurality of reversible ring counters each arranged to count reversibly in response to input signals of alternative predetermined types occurring at random and each having a plurality of bi-stable circuits having stable equilibrium states, the distribution of said equilibrium states in said counters representing a count, circuit connections from each bi-stable circuit to the next preceding and next following circuits for impressing potentials on said next preceding and next following circuits for conditioning said next preceding and next following circuits so that the count representing state will be transferred in one sense in response to a first determined type of pulse and in an opposite sense in response to a second predetermined type of pulse, and a pulse generating circuit having its input connected to a first of said plurality of ring counters, said pulse generating circuit having means for impressing a pulse of a first type on a second of said plurality of ring counters in response to completion of a predetermined count in said first ring counter and impressing a pulse of the second type on said second of said plurality of ring counters in response to the cancellation of a predetermined count in said first ring counter.

4. A reversible counter system comprising a plurality of reversible counters each arranged to count reversibly in response to input signals of alternative predetermined types occurring at random, and each having a plurality of bi-stable circuits having stable equilibrium states, the distribution of said equilibrium states in said counters representing a count, count transfer connections from each bi-stable circuit to the next preceding and next following bi-stable circuit for transferring the count representing state in one sense in response to a first predetermined type of pulse and in another sense in response to a second predetermined type of pulse, and a pulse generating circuit having its input connected to one of said plurality of counters, said pulse generating circuit having means for impressing a pulse of the first type on another of said plurality of counters in response to completion of a predetermined count in said one counter and impressing a pulse of the second type on said another of said plurality of counters in response to the cancellation of a predetermined count in said first counter.

LARRY L. YOUNG.
RAYMOND M. WILMOTTE.

References Cited in the file of this patent

UNITED STATES PATENTS

| Number | Name | Date |
|---|---|---|
| 2,356,761 | Jones | Aug. 29, 1944 |
| 2,404,106 | Snyder | July 16, 1946 |
| 2,442,428 | Mumma | June 1, 1948 |

OTHER REFERENCES

Decade Counting Circuits, Regener, The Review of Scientific Instruments, volume 17, No. 5, May 1, 1946, pages 185–189.

Reversible Decade Counting Circuits, Regener, The Review of Scientific Instruments, volume 17, No. 10, October 1946, pages 375–376.